UNITED STATES PATENT OFFICE.

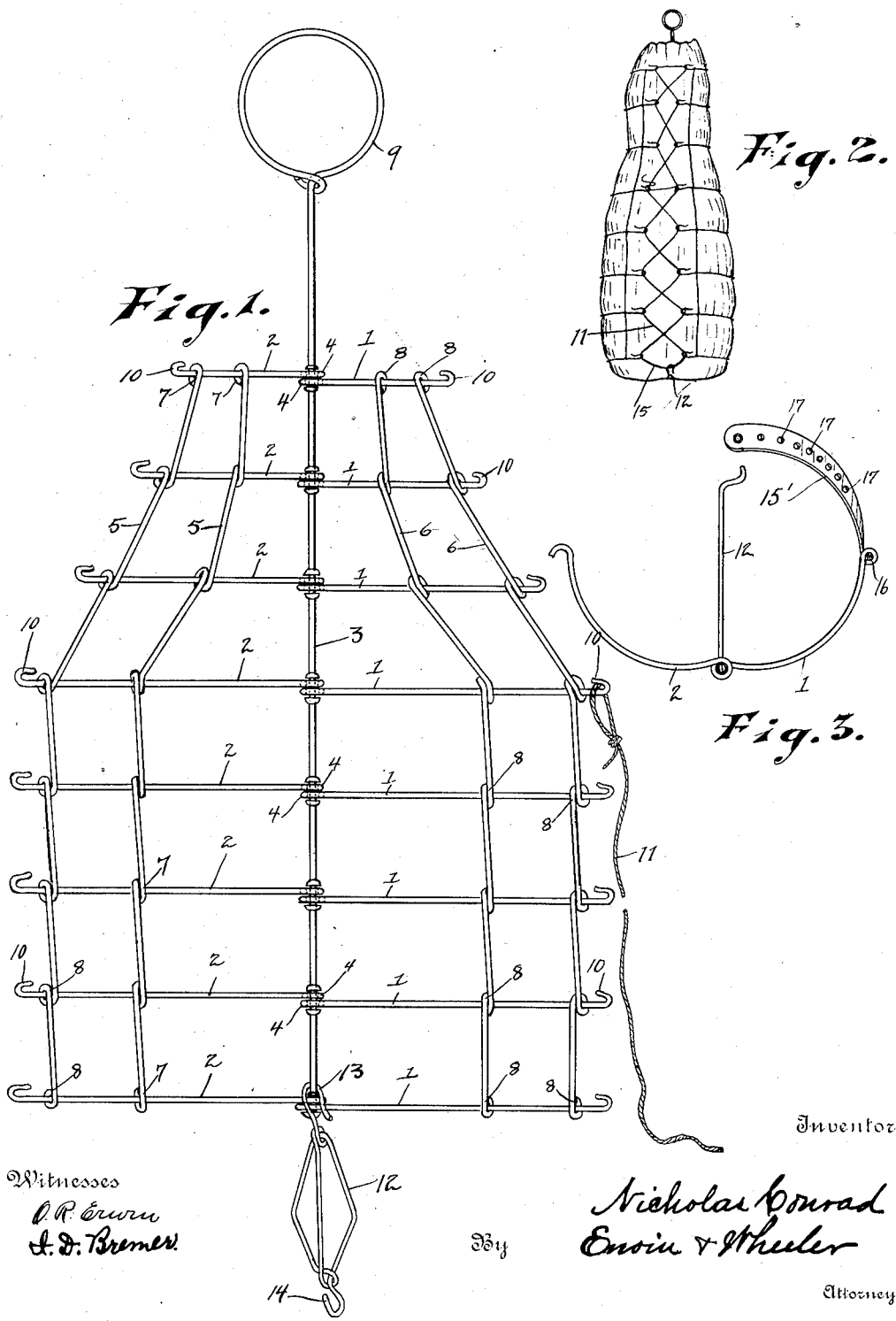

NICHOLAS CONRAD, OF MILWAUKEE, WISCONSIN.

MEAT-BINDER.

985,113.

Specification of Letters Patent.   Patented Feb. 21, 1911.

Application filed October 4, 1909.   Serial No. 520,961.

*To all whom it may concern:*

Be it known that I, NICHOLAS CONRAD, a citizen of the United States, residing at Milwaukee, county of Milwaukee, and State of Wisconsin, have invented new and useful Improvements in Meat-Binders, of which the following is a specification.

My invention relates to improvements in that class of skeleton frames or meat binders in which a series of circular wires adapted to surround a roll of meat, ham, or the like, are connected together by a plurality of longitudinal wires and the opposing ends of the circular wires are provided with lacing hooks and adapted to be drawn and secured together around a roll of meat by a lacing cord, and my improvement pertains more especially, among other things, to the construction of the circular wires by which the roll of meat is adapted to be inclosed. Heretofore it has been common in this class of devices to form each of the circular meat inclosing members of a single resilient piece of wire and the several wires are adapted to spring together around the roll of meat, when they are secured in place by a lacing cord. The binders thus formed are adapted when removed from the meat, to remain in their closed position of their own resiliency, and for this reason, it has been found difficult to place the same around a roll of meat. By my improvement, however, owing to the fact that the respective sides of the frame are formed separately and are connected together by a hinged member, they are adapted to remain open while putting the meat in place and until drawn together by the lacing cord.

The construction of my invention is further explained by reference to the accompanying drawings, in which—

Figure 1 represents a plan view thereof with the respective sides thrown apart preparatory to securing the same around a roll of meat. Fig. 2 represents the same as it appears when drawn together by the lacing cord around the meat, and Fig. 3 shows a modified form of fastening.

Like parts are identified by the same reference numerals throughout the several views.

1, 1, and 2, 2, represent two series of semicircular wires, which are centrally secured together by the hinge rod 3 and the end loops 4, 4.

5, 5, and 6, 6, are longitudinal wires by which the series of semicircular wires 1 and 2 are connected together. The longitudinal wires 5 and 6 are respectively provided with a plurality of loops or circular bends 7 and 8, by which the series of semicircular wires 1 and 2 are connected together.

One end of the hinge rod 3 is preferably provided with a circular loop 9, by which the roll of meat may be suspended from a supporting hook or rod in the ordinary manner.

The outer ends of the several semicircular wires of the series 1 and 2 are provided with hooks 10 for the reception of the lacing cord.

11 is a lacing cord, by which the outer ends of the circular members 1 and 2 are drawn together and secured in place around a roll of meat, as shown in Fig. 2.

12 is an end member, which is connected with the lower end of the frame by the hook 13, while the opposite end of the end member 12 is provided with a hook 14, which is adapted to engage in the lower end 15 of the lacing cord, as shown in Fig. 2, whereby the roll of meat is securely retained in place within the frame.

In the modified form shown in Fig. 3, the lacing cord 11 is dispensed with and the opposing ends of each of the semicircular members are connected together by a link 15'. The several links 15' are provided with a series of perforations 17 for the reception of the opposing hooks of the frame.

Having thus described my invention, what I claim as new, and desire to secure by Letters Patent, is—

In a meat binder of the described class, the combination of two semicircular frame members, a hinge member for foldably connecting together one side of said semicircular frame members, a lacing cord for connecting together the opposite sides of said frame members, and an end member pivotally connected at one end to one end of said frame members and adapted to engage at its opposite end in said lacing cord.

In testimony whereof I affix my signature in the presence of two witnesses.

NICHOLAS CONRAD.

Witnesses:
JAS. B. ERWIN,
O. R. ERWIN.